(12) United States Patent
Lokesh et al.

(10) Patent No.: US 12,585,588 B2
(45) Date of Patent: Mar. 24, 2026

(54) OUT-OF-CORE PROCESSING OF IN MEMORY PROGRAMS THROUGH A USER TRANSPARENT BLOCK CACHE

(71) Applicant: Dell Products L.P., Round Rock, TX (US)

(72) Inventors: Akash Lokesh, Bangalore (IN); Karthik Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/777,693

(22) Filed: Jul. 19, 2024

(65) Prior Publication Data

US 2026/0023686 A1 Jan. 22, 2026

(51) Int. Cl.
| | |
|---|---|
| *G06F 12/08* | (2016.01) |
| *G06F 8/41* | (2018.01) |
| *G06F 12/0811* | (2016.01) |
| *G06F 12/084* | (2016.01) |

(52) U.S. Cl.
CPC ............ *G06F 12/0811* (2013.01); *G06F 8/41* (2013.01); *G06F 12/084* (2013.01)

(58) Field of Classification Search
CPC ....... G06F 12/0811; G06F 8/41; G06F 12/084
See application file for complete search history.

(56) References Cited

U.S. PATENT DOCUMENTS

| | | | |
|---|---|---|---|
| 2019/0013965 A1* | 1/2019 | Sindhu | .................... H04L 49/10 |
| 2020/0026655 A1* | 1/2020 | Wang | .................. G06F 12/0897 |
| 2024/0378054 A1* | 11/2024 | Berson | ................ G06F 11/3466 |

OTHER PUBLICATIONS

Guanyu Feng et al., TriCache: A User-Transparent Block Cache Enabling High-Performance Out-of-Core Processing with In-Memory Programs, ACM Transactions on Storage, vol. 19, No. 2, Article 15, Publication date: Mar. 2023.

* cited by examiner

*Primary Examiner* — Masud K Khan

(74) *Attorney, Agent, or Firm* — Terrile, Cannatti & Chambers, LLP; Emmanuel A. Rivera

(57) ABSTRACT

Described herein are methods and systems for out-of-core processing of in-memory programs through user-transparent block cache comprising initiating a user program. Application code with memory instructions is initiated. A low level virtual machine or LLVM compiler reads and loads the memory and inserts a software translation call before the memory instructions. The software translation call with memory instructions are received by runtime module with multi-level cache that is built on top of shared cache, and load data blocks using the caches.

17 Claims, 3 Drawing Sheets

OUT-OF-CORE PROCESSING OF IN MEMORY PROGRAMS THROUGH A USER TRANSPARENT BLOCK CACHE

BACKGROUND OF THE INVENTION

Field of the Invention

The present invention relates to information handling systems. More specifically, embodiments of the invention provide for out-of-core processing of in memory programs through a user transparent block cache.

Description of the Related Art

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In various implementations, an information handling system can access or utilize external or out-core systems, such as data storage systems (e.g. solid state drives or SSDs). To access storage or memory caching operations are implemented. An information handling system may make use of out-of-core systems to minimize input/output (I/O) operations to read/write to external memory (e.g., storage systems). Such out-of-core systems typically depend on high-performance cache sub-systems to minimize (I/O) operations. Transparency can be provided to users by page caches of operating systems when accessing memory and storage devices/systems; however, there can be efficiency and scalability issues when cache misses occur. To address this issue, out-of-core systems may have to undertake the complex task of designing and implementing specific cache components, including code modifications.

An operating system (OS) page cache can provide for a transparent cache for pages originating from storage devices/systems. The OS page cache can be maintained in unused portions of the main memory of an information handling system, enabling improved access performance for certain storage device/systems. The OS page cache can operate through virtual memory management within kernels, while providing user transparency for out-of-core applications. The OS page cache can suffer from performance bottlenecks such as cache misses involving high-performance nonvolatile memory express (NVMe) solid state drive (SSD) arrays. Challenges can arise from global locking in the kernel. a heavy I/O stack, page faults, context switching overheads. etc.

To address such performance issues, out-of-core systems can be designed and implemented with custom block caching components in the user space. Unlike an OS page cache. a block cache operates predominantly in user space and provides a block interface. Blocks are pinned in memory before reading or writing data in corresponding blocks, invoking unpin when necessary for eviction or flushing according to a replacement policy.

A well designed block cache can be efficient: however, complexities can be presented to developers. such as the block interface with string length calculations. This can be in contrast with a straight forward memory interface. There may be a need for a user space block cache with a virtual memory interface. Implementing a user-space block cache with a virtual memory interface presents challenges. Every memory access requires pin and unpin calls to ensure data residency in memory. Given that pin and unpin operations involve storage-to-memory address translation and concurrency control. optimizations beyond those in current block cache designs are necessary to ensure the efficiency of pin/unpin operations

SUMMARY OF THE INVENTION

A computer-implementable method, system and non-transitory, computer-readable storage medium for out-of-core processing of in-memory programs through user-transparent block cache comprising initiating a user program; running a LLVM compiler when user program is initiated, wherein the LLVM compiler reads and loads memory, and inserts a software translation call before memory instructions; receiving software translation call with memory instructions, and performing runtime to load data blocks using a multi-level cache that is built on top of shared cache.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Vanous implementations provide for scalability of a block cache to utilize storage arrays, such as for nonvolatile memory express (NVMe) solid state drive (SSD) arrays, with a limited number of server threads. Address translation efficiency is provided to replace manual efforts when writing block-aware code with an automatic mechanism and leveraging runtime locality. Supervision of memory access is made available to provide a comprehensive software based scheme to effectively supervise memory access. Methods are based on compile time instrumentation and library hooking techniques, enabling existing in-memory applications to seamlessly operate on storage such as NVMe SSDs through block cache without the need for code modification. A user transparent block cache design implements a user-transparent block cache, offering a virtual memory interface, which enables in memory programs to process out-of-core datasets across various application domains without the requirement for manual code rewriting.

In various embodiments, the TriCache mechanism is implemented and built upon. The virtual memory interface of TriCache can be implemented over a traditional block interface, for concurrent user transparency and out-of-core performance. A multi-level block cache design provides for per-access address translations used by a memory interface. The implementations leverage spatial and temporal localities in memory or storage access in order to efficiently provide storage-to-memory address translation and page-level concurrency control for the virtual memory interface of TriCache.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
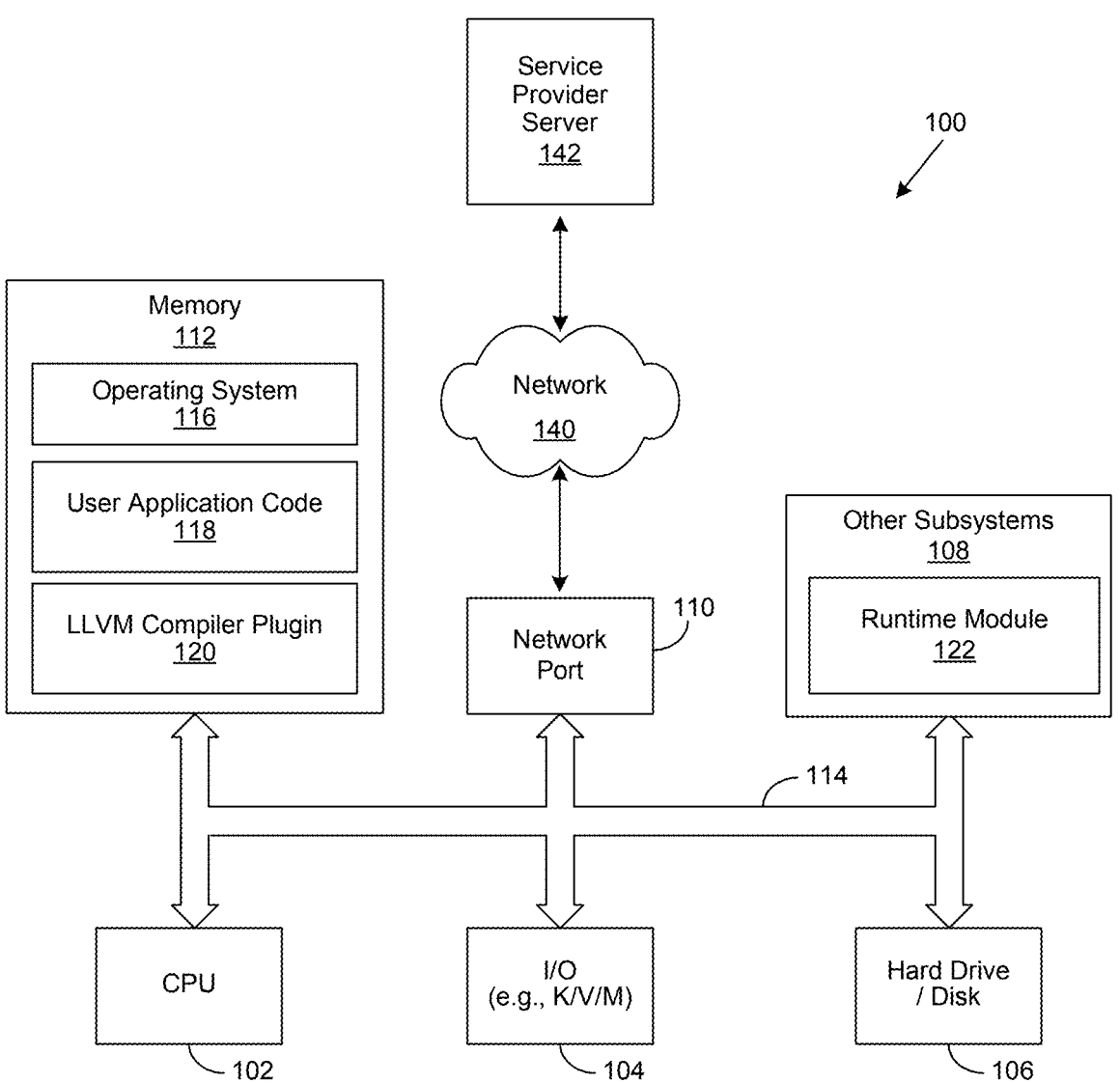
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein. The information handling system 100 can include desktop computer, server computer, a notebook or laptop personal computer (PC), PC integrated into a keyboard, etc.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include user application code 118 and LLVM compiler plugin 120. The LLVM compiler plugin 120 can be implemented as a TriCache LLVM compiler plugin. In various embodiments, the information handling system 100 includes a runtime module 122. Embodiments provide for the runtime module 122 to be included in other systems 108.

In various implementations, the LLVM compiler plugin 120 instruments each memory instruction in the user application code 118. Memory instructions such as load and store. This can involve inserting a software address translation call, for example 'get_raw_ptr' before memory instructions. During execution, instrumented binary calls are made to this interface each time attempts are to access a storage address. A memory address is retrieved pointing to data cached in memory. The translated address is subsequently utilized for memory instruction.

The runtime module 122 serves as a multi-level block cache designed to facilitate fast address translation and provide a virtual memory interface. This runtime module 122 can implement the software address translation call (i.e., 'get_raw_ptr') to translate blocks to their corresponding cached memory addresses. The runtime module 122 manages in-memory data cache for recently accessed blocks, handles I/O operations when cache misses occur, and evicts blocks when cache reaches full capacity.

Figure 2:
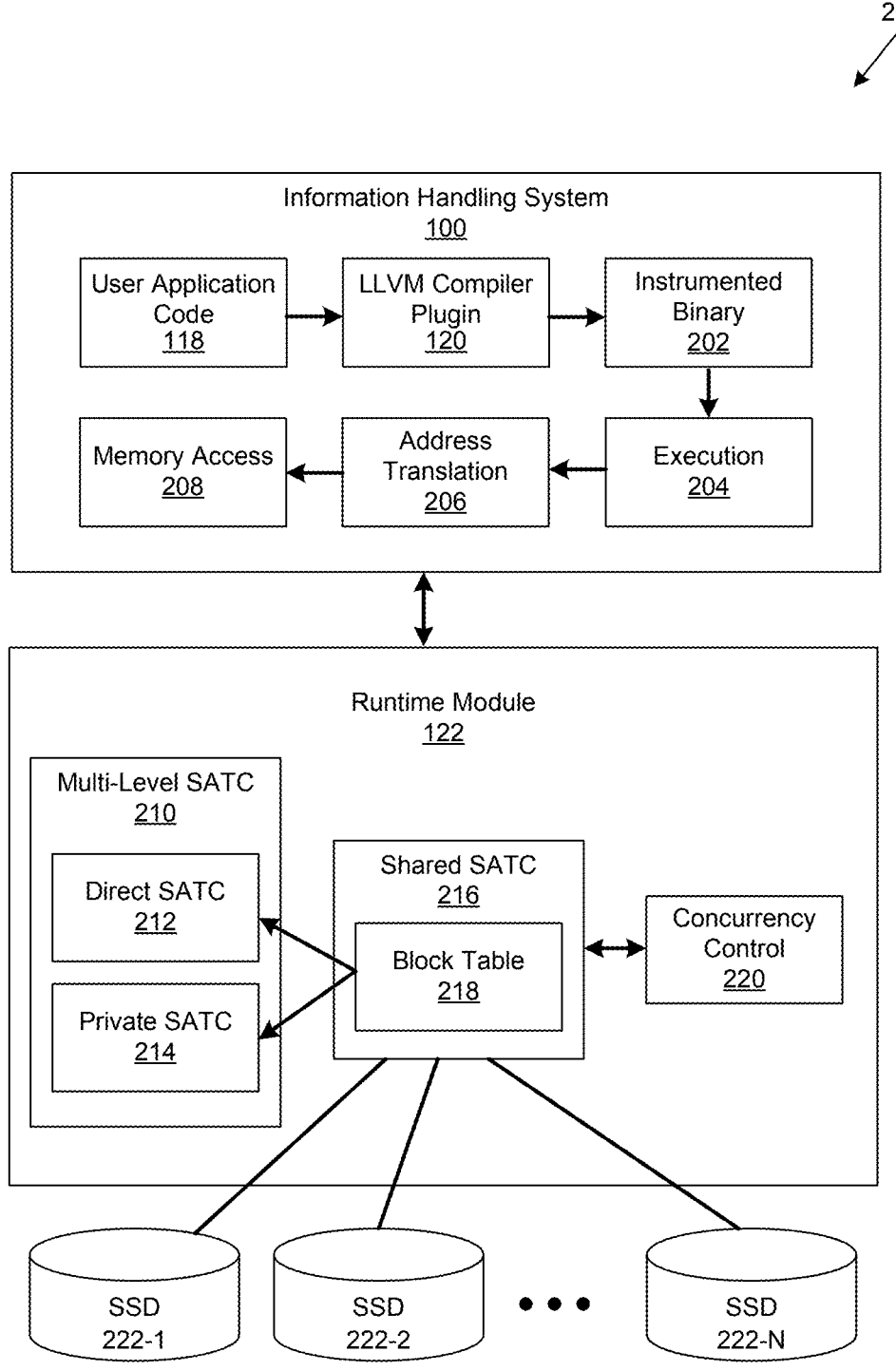
FIG. 2 illustrates a system as implemented for out-of-core processing of in-memory programs through user-transparent block cache.

FIG. 2 shows a system 200 for out-of-core processing of in-memory programs through a user transparent block cache. The information handling system 100 includes the user application code 118 and LLVM compiler plugin 120. The information handling system 100 also includes an instrumented binary module 202, an execution module 204, an address translation module 206 and memory access module 208. The user application code 118 provides memory instructions, such as load and store. The LLVM compiler plugin 120 inserts the software address translation call (i.e., 'get_raw_ptr') before the memory instructions. Instrumented binary module 202 provides binary calls with memory instructions with the software address translation call (i.e., 'get_raw_ptr'). The execution module 204 performs calls with software address translation call (i.e., 'get_raw_ptr') for memory access. The address translation module 206 provides address translation. The memory access module 208 uses translated address for memory instruction.

Information handling system 100 includes or communicates with runtime module 122. The runtime module 122 includes a multi-level SATC 210, which includes a direct SATC 212 and a private SATC 214. The runtime module 122 further includes a shared SATC 216 which includes a block table 218. The runtime module 122 also includes a concurrency control 220. The runtime module 122 communicates to one or more SSDs 222-1 to 222-N.

Beneath a Software Address Translation Cache (SATC), the runtime module 122 manages data with shared SATC 216. The shared SATC 216 is a comprehensive block cache shared among multiple threads, and maintains an in-memory cache pool for reading and writing underlying storage. The shared SATC 216 utilizes block table 218 for all in-memory blocks and offers address translations when the SATC misses. To enhance scalability and prevent bottlenecks, block space is partitioned, with each partition owned by a single thread.

The concurrency control 220 provides for a hybrid lock-free (i.e., lock-free hash) delegation based concurrency control scheme for shared SATC 216. Such a concurrency control scheme distinguishes between address translations and data accesses, ensuring that only address translations call pin/unpin remotely through message passing, while data access directly manipulate memory. The per-partition block table 218 is designed as a concurrent lock-free hash table to further reduce inter-thread message passes.

Implementations provide for a C program to be compiled into a LLVM IR (Intermediate Representation), wherein memory read is compiled to a load instruction. The LLVM compiler plugin 120 instruments the load instruction, resulting in two operations: an instruction calling software address translation call (i.e., 'get_raw_ptr') to obtain the translated memory address, and the other instruction loading the cached data. During execution (i.e., execution module 20), software address translation call (i.e., 'get_raw_ptr') in runtime module 122 triggers an address translation operation sequence, interacting with the direct SATC 212 and the private SATC 214. As further described herein, the direct SATC 212 is directly mapped to and receives recent entries. As further described herein, the private SATC 214 is set associative, has sufficient/ample capacity, and is inter-threaded.

The shared SATC 216 determines overall throughput, particularly in terms of I/O performance. Robust scalability can be achieved using the shared SATC 216 to harness the potential of numerous CPU cores, multiple nonvolatile memory express (NVMe) SSDs (e.g., SSDs 222), and millions of input/output operations per second (IOPS).

Each user thread corresponds to a shared cache client with a client ID. Implementations provide for a polling-based message passing server to be assigned to each partition, processing requests from clients and returning results. Each partition can maintain a concurrent block table for cached blocks in memory, storing block IDs, memory IDs, and metadata. Cached blocks can be indexed by their memory IDs and stored in a memory Pool. An evict policy can be used to manage cached blocks with a zero-reference count, evicting cached blocks based on defined strategies. In certain implementations, a clock/timing algorithm can be used for eviction policies, allowing to customize policies based on application characteristics. The policy implementations can be single threaded, simplifying user considerations for concurrency.

Typically, when manually utilizing a block cache, users may employ a pin interface to obtain an in-memory address for a block. Subsequently, multiple operations may be performed using the in-memory address before releasing the block through an unpin interface. This manual approach allows users to optimize data locality, but at the expense of additional development effort.

The methods described herein provide for the ability to exploit data locality, simulating manual coding without requiring user/developer intervention. The multi-level SATC 210 can be implemented as a two SATC on top of the shared SATC 216, where the direct SATC 212 is a higher level cache that stores "hotter" data with faster access, but with smaller capacity than the private SATC 214 that is a lower level cache. This can mirror a multi-level cache concept found in CPU (i.e., information handling system 100) and hierarchical storage systems.

Implementations provide that as the last-level cache, the private SATC 214, manages data. As the higher-level translation cache, the direct SATC 212, handles metadata, such as modifying reference counts and translating block IDs. This metadata management approach avoids redundant memory consumption, extra memory copies, and memory consistency issues associated with multi-level designs. An inclusive cache policy can ensure that all blocks in direct SATC

212 (i.e., higher-level cache) are present in private SATC 213 (i.e., lower-level cache). This can prevent out-of-space errors when swapping in blocks.

The private SATC 214 is thread-local set-associative cache built on top of the shared SATC 216. When the private SATC 214 hits, user thread utilizes a thread-local block table and evict policy. The private SATC 214 can reduce operations of shared SATC 216 for hot data, and minimize concurrent block table operations and latency.

To further optimize performance, as a direct mapping cache, direct SATC 212 is built on top of private SATC 214. The direct SATC 212 can alleviate overhead from hash table lookups and evict policy maintenance by maintaining recently accessed pages in a fixed-size array. The direct SATC 212 can cover multiple consecutive operations on the hottest blocks, such as sequential reads and writes, thereby reducing the need for manually written pin/unpin operations.

The direct SATC 212 cam also accommodates parallel architectures with stack full co-routines. Implementations provide that each co-routine have a fiber-local direct SATC 212. Co-routines within a thread can share a private SATC 214, with all threads sharing the shared SATC 216. Such an approach can ensure that the hottest blocks for each co-routine are not swapped out by the private SATC 214, when resuming coroutine execution, reducing the need to re-access blocks from the shared SATC 216.

Implementations provide for multi-level SATC 210 to include pin and unpin interfaces. The direct SATC 212 relies on existing blocks in the private SATC 214. The private SATC 214) relies on shared SATC 216. The pin interface of shared SATC 216 is used to load blocks into the private SATC 214, increasing reference counts to prevent swapping. When evicted from private SATC 214, the unpin interface of shared SATC 216 is called to release reference counts. The direct SATC 212 can use a similar scheme as private SATC 214, but provides a single interface or the software address translation call (i.e., 'get_raw_ptr'), implicitly combining pin and unpin calls, ensuring the validity of the raw address until the next software address translation call (i.e., 'get_raw_ptr'). Subsequent accesses may evict previous blocks, potentially triggering unpin calls on private SATC 214 or shared SATC 216.

From a disk only state, a user thread can utilize the software address translation call (i.e., 'get_raw_ptr') function to load blocks into or shared SATC 216, private SATC 214, and direct SATC 212. In the event where the direct SATC 212 evicts blocks, both the shared SATC 216 and private SATC 214 retain the blocks. If a last active thread evicts a block from its private SATC 214, the block transitions into the shared SATC 216 only state. Subsequent use of the software address translation call (i.e., 'get_raw_ptr') function, reloads the block into all three cache levels (i.e., shared SATC 216, private SATC 214, and direct SATC 212). If shared SATC 216 evicts a block, the block is removed from in-memory cache. If the block is "dirty" or up to date, but needs to be written back in memory), the block is written back into storage. This results in a disk only state.

In a default setup, the combined capacity of entries of private SATC 214 matches entries of that of shared SATC 216, representing the largest possible private SATC 214 with an inclusive policy. The maximum size of private SATC 214 can accommodate as many entries as shared SATC 216, aiding in minimizing inter-thread synchronizations. In certain implementations direct SATC 212 can be configured to have a size one-fourth that of private SATC 214 on the same thread. These SATC sizes can be set to optimize performance based on varying workloads.

Figure 3:
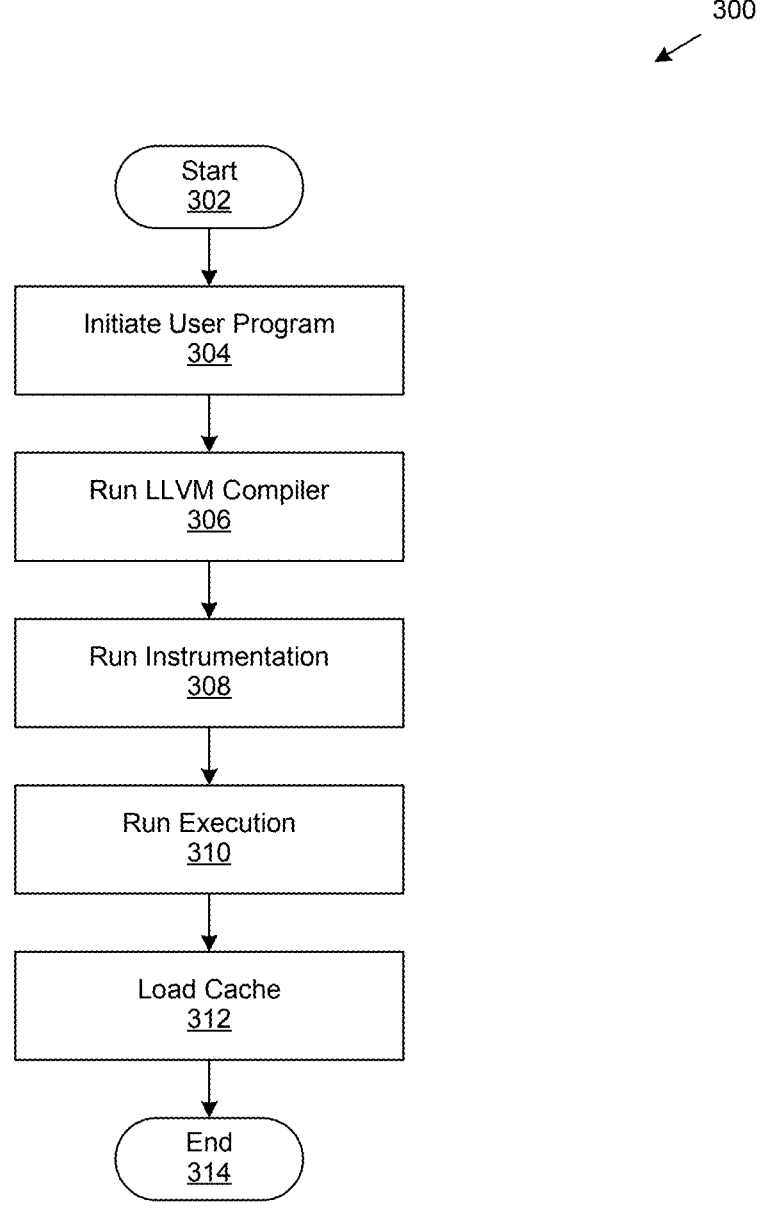
FIG. 3 is a generalized flowchart for out-of-core processing of in-memory programs through user-transparent block cache.

FIG. 3 shows a generalized flowchart out-of-core processing of in-memory programs through user-transparent block cache. The workflow 300 can implement the components as describe in system 200. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 302, the process 300 starts. At step 304, the user program or user application code of information handling system 100 is initiated. The user application code 118 provides memory instructions, such as load and store.

At step 306 the LLVM compiler is run, such as LLVM compiler plugin 120 of information handling system 100. LLVM compiler plugin 120 inserts the software address translation call (i.e., 'get_raw_ptr') before the memory instructions. The LLVM compiler plugin 120 can be LLVM IR (Intermediate Representation), where memory read is compiled to a load instruction.

At step 308, instrumentation is performed, such as by instrumented binary module 202 of information handling system 100, which can provide binary calls with memory instructions with the software address translation call (i.e., 'get_raw_ptr').

At step 310, execution is performed. The execution module 204 of information handling system 100 performs calls with software address translation call (i.e., 'get_raw_ptr') for memory access. The address translation module 206 provides address translation. The memory access module 208 uses translated address for memory instruction.

The software address translation call (i.e., 'get_raw_ptr') is sent to runtime module 122, which includes the multi-level SATC 210 that is built upon shared SATC 216. The multi-level SATC 210 includes direct SATC 212.

At step 312, cache is loaded by the respective SATCs of runtime module 122 as described herein. At step 314, the process 300 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for out-of-core processing of in-memory programs through user-transparent block cache comprising:

initiating a user program;

running an LLVM compiler when user program is initiated, wherein the LLVM compiler reads and loads memory, and inserts a software translation call before memory instructions, wherein the LLVM compiler is a TriCache LLVM compiler plugin;

receiving software translation call with memory instructions, and performing runtime to load data blocks using a multi-level cache that is built on top of shared cache.

2. The computer-implementable method of claim 1, wherein the user program is user application code that provides the memory instructions.

3. The computer-implementable method of claim 1, wherein the multi-level cache is comprised of higher level cache and a lower level cache.

4. The computer-implementable method of claim 1, wherein the multi-level cache implements pin interfaces.

5. The computer-implementable method of claim 1, wherein the shared cache determines throughput in terms of input/output performance.

6. The computer-implementable method of claim 1, wherein the blocks are to data in external storage including NVMe SSDs.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for out-of-core processing of in-memory programs through user-transparent block cache and comprising instructions executable by the processor and configured for:

initiating a user program;

running an LLVM compiler when user program is initiated, wherein the LLVM compiler reads and loads memory, and inserts a software translation call before memory instructions, wherein the LLVM compiler is a TriCache LLVM compiler plugin; and performing runtime to load data blocks using a multi-level cache that is built on top of shared cache.

8. The system of claim 7, wherein the user program is user application code that provides the memory instructions.

9. The system of claim 7, wherein the multi-level cache is comprised of higher level cache and a lower level cache.

10. The system of claim 7, wherein the multi-level cache implements pin interfaces.

11. The system of claim 7, wherein the shared cache determines throughput in terms of input/output performance.

12. The system of claim 7, wherein the blocks are to data in external storage including NVMe SSDs.

13. A non-transitory, computer-readable storage medium embodying computer program code for out-of-core processing of in-memory programs through user-transparent block cache, the computer program code comprising computer executable instructions configured for:

initiating a user program;

running an LLVM compiler when user program is initiated, wherein the LLVM compiler reads and loads memory, and inserts a software translation call before memory instructions, wherein the LLVM compiler is a TriCache LLVM compiler plugin; and performing runtime to load data blocks using a multi-level cache that is built on top of shared cache.

14. The non-transitory, computer-readable storage medium of claim 13, wherein the user program is user application code that provides the memory instructions.

15. The non-transitory, computer-readable storage medium of claim 13, wherein the multi-level cache is comprised of higher level cache and a lower level cache.

16. The non-transitory, computer-readable storage medium of claim 13, wherein the multi-level cache implements pin interfaces.

17. The non-transitory, computer-readable storage medium of claim 13, wherein the shared cache determines throughput in terms of input/output performance.

* * * * *